United States Patent [19]
Rabowsky et al.

[11] Patent Number: 5,680,512
[45] Date of Patent: Oct. 21, 1997

[54] PERSONALIZED LOW BIT RATE AUDIO ENCODER AND DECODER USING SPECIAL LIBRARIES

[75] Inventors: Irving Rabowsky, Woodland Hills; Donald Mead, Carlsbad; Ronnie Burns, Irvine, all of Calif.

[73] Assignee: Hughes Aircraft Company, Los Angeles, Calif.

[21] Appl. No.: 361,348

[22] Filed: Dec. 21, 1994

[51] Int. Cl.$^6$ ........................................ G01L 9/18
[52] U.S. Cl. .................... 395/2.95; 395/2.29; 395/2.67; 395/2.92; 84/604; 84/645
[58] Field of Search .................. 395/2.1, 2.4, 2.67, 395/2.29, 2.91, 2.92, 2.94, 2.95; 381/30; 84/600, 604, 645

[56] References Cited

U.S. PATENT DOCUMENTS

| | | | |
|---|---|---|---|
| 4,876,696 | 10/1989 | Yoshikawa | 375/216 |
| 5,225,618 | 7/1993 | Wadhams | 84/602 |
| 5,243,438 | 9/1993 | Anderton et al. | 358/426 |
| 5,300,724 | 4/1994 | Medovich | 84/604 |
| 5,305,421 | 4/1994 | Kung-Pu | 395/2.28 |
| 5,375,188 | 12/1994 | Serikawa et al. | 395/2.24 |
| 5,444,818 | 8/1995 | Lisle | 395/2.67 |
| 5,457,769 | 10/1995 | Valley | 395/2.19 |

FOREIGN PATENT DOCUMENTS

| | | |
|---|---|---|
| 0 071 176 A2 | 6/1982 | European Pat. Off. . |
| 0 457 161 A2 | 5/1991 | European Pat. Off. . |
| 0 600 639 a2 | 11/1993 | European Pat. Off. . |
| 6161479 | 7/1994 | Japan . |

OTHER PUBLICATIONS

Sadaoki Furui, "Digital Speech Processing, Synthesis, and Recognitiion", Marcel Dekker, Inc., pp. 69–80 1989.
Sadaoki Furui, op.cit., pp. 139, 168–175 1989.
John D. Hoyt and Harry Wechsler, "Detection of Human Speech in Structured Noise", Proc. IEEE ICASSP'94, pp. 11–237 thru 11–240 Apr. 1994.
John D. Hoyt and Harry Wechsler, "RBF Models for Detection of Human Speech in Structured Noise," Proc. 1994 IEEE International Conference on Neural Networks, pp. 4493–4496 Jun. 1994.
05680359

*Primary Examiner*—Allen R. MacDonald
*Assistant Examiner*—Tálivaldis Ivars Šmits
*Attorney, Agent, or Firm*—P. Y. Price; T. Gudmestad; W. K. Denson-Low

[57] ABSTRACT

Methods and systems for encoding an audio signal into a bit stream, and for recreating the audio signal from the bit stream are disclosed. In an embodiment of an encoder, a first encoder (10) symbolically encodes a substantially vocal audio signal to form a first encoded signal. A second encoder (12) symbolically encodes a substantially nonvocal audio signal to form a second encoded signal. A multiplexer (14) multiplexes the first encoded signal and the second encoded signal to form the bit stream. In an embodiment of a decoder, a demultiplexer (80) extracts an encoded vocal signal and an encoded nonvocal signal from the bit stream. A first decoder (82) forms a decoded vocal signal based upon the encoded vocal signal. A second decoder (84) forms a decoded nonvocal signal based upon the encoded nonvocal signal. A mixer (86) combines the decoded vocal signal with the decoded nonvocal signal to form the audio signal.

5 Claims, 2 Drawing Sheets

PERSONALIZED LOW BIT RATE AUDIO ENCODER AND DECODER USING SPECIAL LIBRARIES

TECHNICAL FIELD

The present invention relates generally to methods and systems for audio signal processing, and more particularly, to methods and systems for encoding and decoding audio signals.

BACKGROUND OF THE INVENTION

Audio compression systems are employed to reduce the number of bits needed to transmit and store a digitally-sampled audio signal. As a result, a lower bandwidth communication channel can be employed to transmit a compressed audio signal in comparison to an uncompressed audio signal. Similarly, a reduced capacity of a storage device, which can comprise a memory or a magnetic storage medium, is required for storing the compressed audio signal. A general audio compression system includes an encoder, which converts the audio signal into a compressed signal, and a decoder, which recreates the audio signal based upon the compressed signal.

In the design of the audio compression system, an objective is to reduce the number of bits needed to represent the audio signal while preserving its content and fidelity. Current methods and systems for audio compression have achieved an excellent quality of fidelity at a transmission bit rate of 128 kilobits per second for monaural audio and 256 kilobits per second for stereo audio. These methods and systems are based upon directly compressing a waveform representation of the audio signal.

SUMMARY OF THE INVENTION

The need exists for an audio compression system which significantly reduces the number of bits needed to transmit and store an audio signal, and which simultaneously preserves the content and fidelity of the audio signal.

It is thus an object of the present invention to significantly reduce the bit rate needed to transmit an audio signal.

Another object of the present invention is to provide an audio encoder and a corresponding audio decoder which allows a selectable personalization of an encoded audio signal.

A further object of the present invention is to provide a symbolic encoding and decoding of an audio signal.

In carrying out the above objects, the present invention provides a system for encoding an audio signal into a bit stream, wherein the audio signal contains a first audio signal representative of audio which is substantially vocal and a second audio signal representative of audio which is substantially nonvocal. A first encoder symbolically encodes the first audio signal to form a first encoded signal. A second encoder symbolically encodes the second audio signal to form a second encoded signal. A multiplexer, which is coupled to the first encoder and the second encoder, multiplexes the first encoded signal and the second encoded signal to form the bit stream.

Further in carrying out the above objects, the present invention provides a system for encoding an audio signal into a bit stream, wherein the audio signal contains a first audio signal representative of audio which is substantially vocal and a second audio signal representative of audio which is substantially nonvocal. A first encoder symbolically encodes the first audio signal to form a first encoded signal. A signal analyzer decomposes the second audio signal into a plurality of decomposed signals based upon a corresponding plurality of predetermined signal classes. The plurality of decomposed signals include a MIDI decomposed signal and a wavetable decomposed signal. A feature recognizer having a first library of MIDI sound elements, a second library of wavetable sound elements, and a third library, is coupled to the signal analyzer. The feature recognizer is capable of forming a difference signal in dependence upon the decomposed signals and one of the sound elements and storing a representation of the difference signal in the third library. The feature recognizer is further capable of producing a first coded identifier representative of at least one of the MIDI sound elements in dependence upon the MIDI decomposed signal. The feature recognizer is still further capable of producing a second coded identifier representative of at least one of the wavetable sound elements in dependence upon the wavetable decomposed signal. The feature recognizer is also capable of producing a third coded identifier representative of the difference signal. A first multiplexer, which multiplexes the first coded identifier, the second coded identifier, and the third coded identifier to form a second encoded signal, is coupled to the feature recognizer. A second multiplexer is coupled to the first encoder and to the first multiplexer. The second multiplexer forms the bit stream by multiplexing the first encoded signal with the second encoded signal.

Still further in carrying out the above objects, the present invention provides methods of encoding an audio signal into a bit stream in accordance with the steps performed by the above-described systems, wherein the audio signal contains a first audio signal representative of audio which is substantially vocal and a second audio signal representative of audio which is substantially nonvocal.

Yet still further in carrying out the above objects, the present invention provides a system for recreating an audio signal from a bit stream representative of an encoded audio signal. A demultiplexer extracts an encoded vocal signal and an encoded nonvocal signal from the bit stream. A first decoder, which forms a decoded vocal signal based upon the encoded vocal signal, is coupled to the demultiplexer. A second decoder, which forms a decoded nonvocal signal based upon the encoded nonvocal signal, is coupled to the demultiplexer. A mixer, coupled to the first decoder and the second decoder, combines the decoded vocal signal with the decoded nonvocal signal to form the audio signal.

Still further in carrying out the above objects, the present invention provides a system for recreating an audio signal from a bit stream representative of an encoded audio signal. A demultiplexer extracts an encoded vocal signal and an encoded nonvocal signal from the bit stream. The encoded nonvocal signal includes a first symbolic encoded signal, a second symbolic encoded signal, and a third symbolic encoded signal based upon a plurality of predetermined signal classes, wherein the predetermined signal classes include a MIDI class, a wavetable class, and a special library class. A first decoder, coupled to the demultiplexer, forms a decoded vocal signal based upon the encoded vocal signal. A first symbolic decoder, which includes a library of MIDI sound elements, is coupled to the demultiplexer. The first symbolic decoder is capable of generating one of the MIDI sound elements in dependence upon a first symbolic encoded signal of a MIDI signal class contained in the encoded nonvocal signal. A second symbolic decoder, which includes a library of wavetable sound elements, is coupled to the demultiplexer. The second symbolic decoder is capable of generating one of the wavetable sound elements in dependence upon a second symbolic encoded signal of a wavetable signal class contained in the encoded nonvocal signal. A third symbolic decoder, which includes a library of special sound elements, is coupled to the demultiplexer. The third symbolic decoder is capable of generating one of the special sound elements in dependence upon a third symbolic encoded signal of a special library signal class contained in the encoded nonvocal signal. A signal synthesizer, which forms a decoded nonvocal signal based upon the generated sound elements, is coupled to the first, second, and third symbolic decoder. A mixer is coupled to the first decoder and the signal synthesizer. The mixer combines the decoded vocal signal and the decoded nonvocal signal to form the audio signal.

Yet still further in carrying out the above objects, the present invention provides methods of recreating an audio signal from a bit stream representative of an encoded audio signal in accordance with the steps performed by the above-described systems.

These and other features, aspects, and advantages of the present invention will become better understood with regard to the following description, appended claims, and accompanying drawings.

BEST MODES FOR CARRYING OUT THE INVENTION

In overcoming the disadvantages of previous systems, the present invention provides an encoder/transmitter which separately encodes vocal and nonvocal audio signals. Symbolic representations are formed for the vocal and nonvocal audio signals. These symbolic representations include phonemes, MIDI, and wavetables. The encoded vocal and nonvocal signals are transmitted to a corresponding decoder/receiver which employs separate vocal and nonvocal decoders. The nonvocal decoder receives data which identifies MIDI, wavetable, and special codes, and uses corresponding libraries and tables stored in memory to reproduce the sounds. The reproduced vocal and nonvocal audio is mixed for presentation to a user. Further, the encoder/transmitter is capable of transmitting personalization data which enhances the performance of the decoder/receiver, and allows a resultant signal to be tailored.

Figure 1:
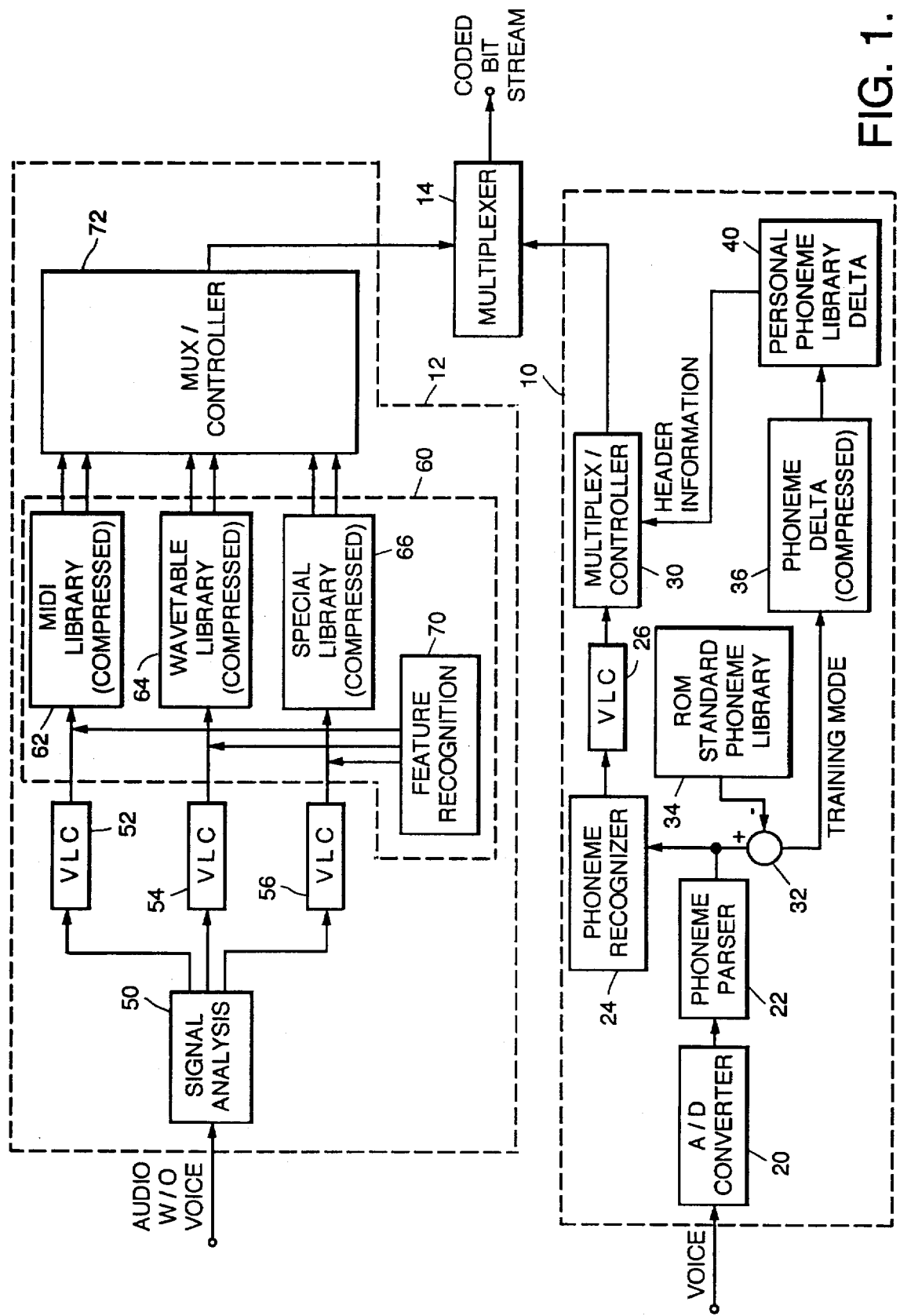
FIG. 1 is a block diagram of an embodiment of an encoder in accordance with the present invention.

An embodiment of an audio encoder in accordance with the present invention is illustrated by the block diagram in FIG. 1. The audio encoder provides a system for encoding an audio signal into a bit stream for transmission to a corresponding decoder. The audio signal contains a vocal audio signal and a nonvocal audio signal. The vocal audio signal is a signal representative of substantially vocally-produced audio, which can include spoken words, singing, and other vocal utterances. The nonvocal audio signal is a signal representative of substantially nonvocally-produced audio, such as music and other types of sound.

The vocal audio signal is applied to a first encoder 10 which forms an encoded vocal signal. Similarly, the nonvocal audio signal is applied to a second encoder 12 which forms an encoded nonvocal signal. A multiplexer 14, which is coupled to first encoder 10 and the second encoder 12, forms the bit stream by multiplexing the encoded vocal signal and the encoded nonvocal signal.

Upon entering the first encoder 10, the vocal audio signal is applied to an analog-to-digital converter 20. The analog-to-digital converter 20 digitizes the vocal signal to form a digital vocal signal. If the vocal signal is already in a digital form, the analog-to-digital converter 20 is not required. A phoneme parser 22 is coupled to the analog-to-digital converter 20. The phoneme parser 22 identifies the time base for each phoneme contained within the digital vocal signal, and parses the digital vocal signal into at least one phoneme based upon the time base.

The phoneme parser 22 is coupled to a phoneme recognizer 24 which recognizes the at least one phoneme from a predetermined phoneme set, and assigns a symbolic code to each of the at least one phoneme. In a preferred embodiment for the English language, the phoneme recognizer 24 assigns a unique six-bit symbolic code to each of the approximately forty phonemes in the English language. One with ordinary skill in the art will recognize that the number of bits needed for coding the phonemes is dependent upon the number of phonemes in the language of interest. In order to allow encoding of vocal audio which results from singing, the predetermined phoneme set may also include singing phonemes. Consequently, the number of bits employed for encoding the English language may be increased from the six-bit standard in order to include the singing phonemes.

The symbolic code from the phoneme recognizer 24 is applied to a variable length coder 26. The variable length coder 26 provides a variable length code of the symbolic code based upon the relative likelihood of the corresponding phoneme to be spoken. More specifically, phonemes which occur frequently in typical speech are coded with a shorter length codes, while phonemes which occur infrequently are coded with longer length codes. The variable length coder 26 is employed to reduce the average number of bits needed to represent a typical speech signal. In a preferred embodiment, the variable length coder employs a Huffman coding scheme. The variable length coder is coupled to a multiplexer 30 which formats the variable length code into a serial bit stream.

The phoneme parser 22 is coupled to difference processor 32 which forms a difference signal between a user-spoken phoneme waveform and a corresponding waveform from a standard phoneme waveform library. The standard phoneme waveform library is contained within a first electronic storage device 34, such as a read-only memory, coupled to the difference processor 32. The first electronic storage device 34 contains a standard waveform representation of each phoneme from the predetermined phoneme set.

The difference signal is compressed by a data compressor 36 coupled to the output of the difference processor 32. A representation of the compressed difference signal is stored in a second electronic storage device 40. As a result, the second electronic storage device 40 contains a personal phoneme library for the user of the decoder. The multiplexer 30 is coupled to the second electronic storage device 40 so that the bit stream provided thereby is based upon both the symbolic code generated by the phoneme recognizer 24 and the representation of the difference signal. In a preferred embodiment, the multiplexer 30 formats a header based upon the personal phoneme library upon an initiation of transmission.

The combination of the difference processor 32, the first electronic storage device 34, the data compressor 36, and the second electronic storage device 40 forms a system which performs a personalization training of the encoder. Thus, in a predetermined training mode, the output of the phoneme parser 22 is compared to the standard phoneme waveform library, and a difference phoneme waveform, i.e. a delta phoneme waveform, is formed and compressed. The delta phoneme waveform is then stored in the personal phoneme library of the encoder for later transmission.

The second encoder 12 includes a signal analyzer 50 which decomposes the nonvocal audio signal into a plurality of decomposed signals based upon a corresponding plurality of predetermined signal classes. If the nonvocal audio signal is an analog signal, the signal analyzer 50 can include an analog-to-digital converter in order to provide a digital bit stream for further processing therewithin. In the embodiment of FIG. 1, three predetermined signal classes are defined: a MIDI class, a wavetable class, and a special library class. As such, the nonvocal audio signal is segregated into a MIDI bit stream, a wavetable bit stream, and a special library bit stream in dependence upon the type of sound in the nonvocal audio signal and the application.

In some applications, it is not necessary to decompose the nonvocal audio signal. For instance, the nonvocal audio signal may be in the form of music generated by an instrument which directly produces a MIDI file. In these applications, the decomposed signals are directly applied to the second encoder 12 without having to employ the signal analyzer 50.

Optionally, each bit stream is applied to a corresponding variable length coder (VLC). Specifically, the MIDI bit stream is applied to a first VLC 52, the wavetable bit stream is applied to a second VLC 54, and the special library bit stream is applied to a third VLC 56. Each VLC provides a variable length code which reduces the average number of bits needed to represent each bit stream.

The variable length coders 52, 54, and 56 are coupled to a feature recognizer 60. The feature recognizer 60 produces at least one coded identifier in dependence upon the nonvocal audio signal, and forms the encoded nonvocal signal based upon the at least one coded identifier. More specifically, the feature recognizer 60 includes at least one library of prestored sound elements, wherein the at least one coded identifier is representative of at least one of the sound elements.

In the embodiment of FIG. 1, the feature recognizer 60 includes a MIDI library 62 which contains MIDI sound elements, a wavetable library 64 which contains wavetable sound elements, and a special library 66 which contains special sound elements. Each sound in the MIDI bit stream is compared by a feature recognition subsystem 70 to the MIDI sound elements in the MIDI library 62. The closest element in the MIDI library 62 is selected, and a coded identifier of this MIDI element is obtained. Similarly, each sound in the wavetable bit stream is compared to the wavetable sound elements in the wavetable library 64. The closest element in the wavetable library is selected, and a coded identifier of this wavetable element is obtained. Various metrics of correlation can be employed for determining the closest element.

The feature recognizer 60 is capable of forming a difference signal in dependence upon the nonvocal audio signal and the one of the sound elements. A representation of the difference signal is stored in the special library 66. In the embodiment of FIG. 1, a difference signal can be formed between the MIDI bit stream and a MIDI sound element, between the wavetable bit stream and a wavetable sound element, or between the special library bit stream and a special library sound element. The stored difference signals comprise a personality file which is used to modify the sound presentation produced by a subsequently-described decoder. More specifically, the personality file may include information relating to the relative volume, timbre, and other special characteristics used to modify each of the sound elements. Moreover, the personality file may include representations of unique sounds in which a highly-correlated element in any of the libraries does not exist.

The feature recognizer 60 variable length codes the MIDI, wavetable, and special library coded identifiers for application to a multiplexer 72. The multiplexer 72 multiplexes each of the coded identifiers with any special personality files and timing information to produce the encoded nonvocal signal. In a preferred embodiment, the encoded nonvocal signal is in the form of a serial bit stream. The output of the second encoder 12 is applied to the multiplexer 14, as is the output of the first encoder 10, to provide a combined coded output for transmission to a corresponding decoder.

As one having ordinary skill in the art will recognize, each of the multiplexers 14, 30, and 72 may include a corresponding buffer to store a portion of a bit stream. This allows for management of the output bit stream subject to varying conditions on the input bit streams. Preferably, a reference clock is employed with presentation time stamps to align the input and the output of the multiplexers.

Figure 2:
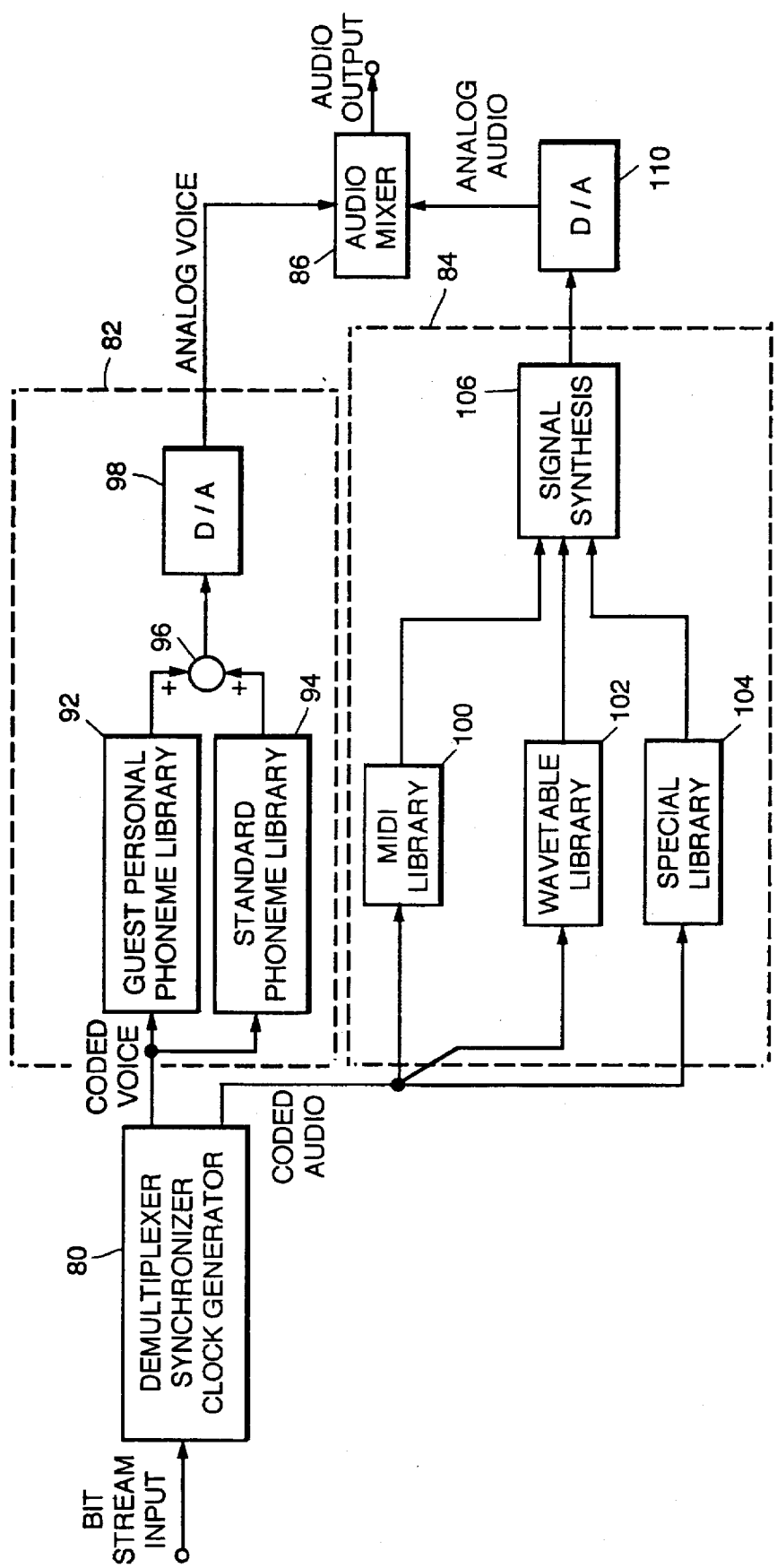
FIG. 2 is a block diagram of an embodiment of a decoder in accordance with the present invention.

In accordance with the present invention, an embodiment of a decoder/receiver is illustrated by the block diagram in FIG. 2. The decoder provides a system for recreating an audio signal from a bit stream representative of an encoded audio signal received from a corresponding encoder. The bit stream enters a demultiplexer 80, which recovers a reference clock signal and generates an internal clock signal in order to phase lock onto the bit stream. The demultiplexer 80 is capable of performing a demultiplexing operation wherein an encoded vocal signal and an encoded nonvocal signal are extracted from the bit stream. In a preferred embodiment, the demultiplexer 80 decodes a transport layer which provides presentation time stamps, and segregates the incoming bit stream into an encoded vocal bit stream and an encoded nonvocal bit stream which are decompressed.

Based upon the encoded vocal signal, a first decoder 82 produces a decoded vocal signal. Similarly, a second decoder 84 is employed to produce a decoded nonvocal signal based upon the encoded nonvocal signal. An audio mixer 86 is coupled to the first decoder 82 and the second decoder 84 to combine the decoded vocal signal and the decoded nonvocal signal, thus producing the recreated audio signal.

From the encoded vocal signal, the demultiplexer 80 is capable of extracting at least one difference signal representative of a difference between a user-spoken phoneme waveform and a corresponding phoneme waveform from a standard phoneme waveform set. In a preferred embodiment, the at least one difference signal is received within a header in the bit stream. The demultiplexer 80 provides the at least one difference signal to a storage device 92 within the first decoder 82. The storage device 92 stores a representation of the at least one difference signal. In a preferred embodiment, the demultiplexer 80 sends the header to the storage device 82. As a result, the storage device 92, which can be embodied by a standard DRAM, forms a guest personal phoneme library for the first decoder 82.

The demultiplexer 80 is further capable of extracting at least one symbolic code from the bit stream, wherein each of the at least one symbolic code is representative of a corresponding phoneme from a predetermined phoneme set. In a preferred embodiment, the demultiplexer 80 blocks the encoded vocal bit stream into six-bit blocks, each representing a phoneme. The at least one symbolic code is applied to a standard phoneme waveform generator 94 within the first decoder 82. The standard phoneme waveform generator 94 which generates a corresponding phoneme waveform from the standard waveform set for each of the at least one symbolic code. In a preferred embodiment, each of the six-bit blocks selects a particular phoneme from the standard waveform set. As a result, a recreated speech signal, typically represented digitally, is formed.

The output of the standard phoneme waveform generator 94 and the output of the storage device 72 are applied to a summing element 96. The summing element 96 combines the phoneme waveform from the standard waveform set with the difference signal in order to recreate the voice of the original speaker. The output of the summing element 96 is applied to a digital-to-analog converter 98 in order to form an analog recreated speech signal. The analog recreated speech signal forms the decoded vocal signal which is applied to the audio mixer 86.

Next, an embodiment of the second decoder 84 is described in detail. The encoded nonvocal signal extracted by the demultiplexer 80 includes a plurality of symbolic encoded signals based upon a plurality of predetermined signal classes. In the embodiment of FIG. 2, the signal classes include a MIDI class, a wavetable class, and a special library class. As such, the symbolic encoded signals include a MIDI encoded signal, a wavetable encoded signal, and a special library encoded signal.

The MIDI encoded signal is applied to a MIDI symbolic decoder 100 which contains a library of MIDI sound elements. The MIDI symbolic decoder 100 generates at least one of the MIDI sound elements in response to receiving the MIDI encoded signal. Similarly, the wavetable encoded signal is applied to a wavetable symbolic decoder which contains a library of wavetable sound elements. The wavetable decoder 102 generates at least one of the wavetable sound elements in response to receiving the wavetable encoded signal. The special library encoded signal is applied to a special library decoder 104 which contains a special library of sound elements. The special library decoder 104 generates at least one of the special library sound elements in response to receiving the special library encoded signal. In a preferred embodiment, the header information of the encoded nonvocal bit stream is used to identify each sound element to be played.

A signal synthesizer 106 is coupled to the MIDI symbolic decoder 100, the wavetable symbolic decoder 102, and the special library decoder 104. The signal synthesizer 106 is employed to construct the nonvocal audio signal based upon the generated sound elements prior to the addition of the vocal audio in the mixer 86. The signal synethesizer 106 constructs the nonvocal audio signal based upon timing information provided by time stamps and other descriptive information in the header. The output of the signal synthesizer 106 is applied to a digital-to-analog converter 110, which provides an analog nonvocal audio signal for application to the audio mixer 86. The audio mixer combines the vocal and nonvocal audio signals for presentation to the user.

In an alternative embodiment, the audio mixer 86 mixes the digital signals directly from the output of the summing element 96 and the signal synthesizer 106. As a result, the digital-to-analog converters 98 and 110 are eliminated. The mixed digital signal produced by the audio mixer 86 can be converted to analog by a digital-to-analog converter coupled to the output of the audio mixer 86. However, the step of converting the mixed signal to an analog form is optional.

The above-described embodiments of an encoder and a decoder in accordance with the present invention work together as follows. When information in the personality library 40 or the special library 66 are updated to include new features, the database in the decoder special library 104 is updated accordingly. When the new feature is encountered for the first time, the entire delta is transmitted along with a library identification number. The second time the new feature is encountered, only the library identification number needs to be sent from the encoder to the decoder.

The above-described versions of the present invention have many advantages. By utilizing tables of symbolic codes such as MIDI, wavetables, and special symbolic tables, a full representation of nonvocal audio signals can be encoded and transmitted at a significantly reduced bit rate. By transmitting a personality file together with the table codes and timing information, the nonvocal audio presentation can be modified to include special characteristics of the sound such as relative volume and timbre. Moreover, the personality file allows the encoding and transmission of unique sounds which do not have a highly-correlated counterpart in any of the tables. Further, storing large libraries in the decoder results in a substantial reduction in the required transmission bit rate, and analogously the required storage capacity.

Embodiments of the present invention can be applied to such audio products as compact disk players and digital audio players, and to audio transmission systems such as radio, television and videophone.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A system for encoding an audio signal into a bit stream to reduce bits required to transmit and store the audio signal while preserving fidelity of the audio signal, the system comprising:

an encoder which symbolically encodes the audio signal to form an encoded signal, the encoder including a feature recognizer having at least one library of sound elements, the feature recognizer producing at least one coded identifier in dependence upon the audio signal to reduce the bits required to transmit and store the audio signal, wherein the at least one coded identifier is representative of at least one of the sound elements, and wherein the encoded signal is formed in dependence upon the at least one coded identifier, and wherein the feature recognizer forms an encoded difference signal in dependence upon the audio signal and the at least one of the sound elements to preserve fidelity of the audio signal; and a first multiplexer, coupled to the encoder which multiplexes the encoded signal and the difference signal to form the bit stream.

2. A system for encoding an audio signal into a bit stream using tables of symbolic codes to reduce required bit rate for transmission and storage while maintaining fidelity of the audio signal, the system comprising:

a feature recognizer having a first library of MIDI sound elements and a second library, the feature recognizer forming a difference signal in dependence upon the audio signal and one of the sound elements and storing a representation of the difference signal in the second library, the feature recognizer producing a first coded identifier representative of at least one of the MIDI sound elements in dependence upon the audio signal, and producing a second coded identifier representative of the difference signal to maintain fidelity of the audio signal; and a multiplexer, coupled to the feature recognizer, which multiplexes the first coded identifier and the second coded identifier to form a reduced bit rate encoded signal which preserves the fidelity of the audio signal.

3. A method of encoding an audio signal into a bit stream to reduce required bit rate and maintain fidelity of the audio signal, the method comprising:

symbolically encoding the audio signal to form an encoded signal by producing at least one coded identifier in dependence upon the audio signal;

forming a difference signal in dependence upon the audio signal and one of the sound elements; and forming the encoded signal in dependence upon the difference signal and the at least one coded identifier, the at least one coded identifier being representative of at least one of a plurality of sound elements.

4. A method of encoding an audio signal into a bit stream, to reduce bits required for storage and transmission while maintaining fidelity of the audio signal, the method comprising forming a difference signal in dependence upon the audio signal and one of a plurality of predefined sound elements;

storing a representation of the difference signal;

producing a first coded identifier representative of at least one of a plurality of MIDI sound elements in dependence upon the audio signal;

producing a second coded identifier representative of the difference signal; and multiplexing the first coded identifier and the second coded identifier to form the bit stream.

5. A method of recreating an audio signal from a bit stream representative of an encoded audio signal, the method comprising the steps of:

extracting an encoded signal including a plurality of symbolic encoded signals based upon a plurality of predetermined signal classes from the bit stream, the predetermined signal classes including a special library class representing differences between the audio signal and elements of at least one of a MIDI class and a wavetable class; and forming a decoded audio signal based upon the encoded audio signal.

* * * * *